United States Patent
Wang et al.

(10) Patent No.: US 7,459,689 B2
(45) Date of Patent: Dec. 2, 2008

(54) DETECTOR HEAD POSITION CALIBRATION AND CORRECTION FOR SPECT IMAGING APPARATUS USING VIRTUAL CT

(75) Inventors: Sharon Xiaorong Wang, Hoffman Estates, IL (US); Joseph Fang, Barrington, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 11/471,217

(22) Filed: Jun. 20, 2006

(65) Prior Publication Data

US 2007/0290125 A1    Dec. 20, 2007

(51) Int. Cl.
*G01T 1/161* (2006.01)
*G01D 1/00* (2006.01)

(52) U.S. Cl. .............................. 250/363.09; 250/252.1; 250/363.03; 378/20; 378/205; 378/206; 378/207; 378/208

(58) Field of Classification Search ............... 250/252.1, 250/363.03, 363.09; 378/20, 205–208
See application file for complete search history.

(56) References Cited

U.S. PATENT DOCUMENTS 5,481,115 A * 1/1996 Hsieh et al. ............. 250/363.04
6,140,650 A * 10/2000 Berlad ................... 250/363.09

* cited by examiner

*Primary Examiner*—David P Porta
*Assistant Examiner*—Casey Bryant

(57) ABSTRACT

A multiple point source test phantom is used for calibration of detector positioning of a nuclear medical imaging apparatus. An absolute coordinate system for the detectors is aligned to an image reconstruction space coordinate system by fitting a Gaussian surface to a peak of a center point source of said test phantom, and using displacement parameters as obtained from the fitted Gaussian surface to calculate a displacement correction parameter, which is used to move a patient bed of the imaging apparatus such that the image reconstruction space is aligned with the absolute coordinate system.

18 Claims, 7 Drawing Sheets

DETECTOR HEAD POSITION CALIBRATION AND CORRECTION FOR SPECT IMAGING APPARATUS USING VIRTUAL CT

BACKGROUND OF THE INVENTION

1. Field of the Invention

This invention relates generally to nuclear medical imaging, and more specifically, to improvement in calibration of multiple detector head positioning in SPECT imaging.

2. Background and Prior Art

In nuclear imaging, a patient is injected with or swallows a radioactive isotope which has an affinity for a particular organ, structure or tissue of the body.

Gamma rays are then emitted from the body part of interest, are collimated by a collimator so that only gamma photons traveling in a direction perpendicular to the surface of a detector head are allowed to impinge on the detector head, and are detected by a gamma camera apparatus including the detector head, which forms an image of the organ based on the detected concentration and distribution of the radioactive isotope within the body part of interest. Nuclear images may be obtained using single photon emission (either planar or Single Photon Emission Computed Tomography (SPECT)) and Position Emission Tomography (PET). Planar imaging essentially compresses a three-dimensional radiation field onto a two-dimensional image plane, while SPECT and PET produce multiple image "slices," each representing a different plane in a three-dimensional region, such that when the slices are considered collectively, a three-dimensional image of the region may be studied.

Among the various factors that cause SPECT image distortion, detector head deflection and alignment issues are among the largest sources of error. Siemens Medical Solutions USA, Inc. recently introduced an imaging platform that provides a versatile mechanical system that allows the detectors to scan at optimal positions for various studies, such as cardiology studies. However, the versatility of the mechanical platform amplifies the challenges involved in accurate detector head position calibration because it introduces the capability for new detector positions and accordingly the conventional projection geometry assumptions used in image reconstruction are no longer applicable, leading to potential for image blurring and distortion.

While one way to reduce such problems is mechanical measurement of the detector heads, such a procedure is costly and still cannot eliminate the errors caused by the electronics and other system factors.

It is known to calibrate SPECT detector heads by using a Multi Head Registration (MHR) phantom, which incorporates five radioactive point sources arranged on a plane. The planar arrangement limits MHR to two-dimensional analyses, such that no more than two of the five possible positional parameters can be corrected. Experiments have shown, however, that at some positions all five position-parameters can have large disparities from frame to frame; consequently correction of the x coordinate with one overall value and the y coordinate for each frame is insufficient and can result in degradation of image quality. The two-dimensional limitation of the MHR phantom calibration is a result of the absolute spatial coordinates of the phantom being unknown. Instead, an iterative algorithm is used to estimate the phantom coordinates, which are determined on a planar configuration as such is easier to converge.

Siemens Medical Solutions has developed a new calibration method for a hybrid SPECT/CT imaging system that by utilizing CT data to establish a global spatial coordinate system of a common test phantom. See copending U.S. patent application Ser. No. 11/091,253, incorporated herein by reference in its entirety.

In such method, the common test phantom is used to obtain a set of point source nuclear images. Gaussian peaks are fitted to each point source for each frame of projection data, to obtain a set of projected centroid data. A pair of cones is then generated by using the geometric correspondence between the three-dimensional centroids and their projections on the two dimensional image plane. Among the two bundles of intersecting lines from the generated pair of cones, one pair of lines will form an angle that is equal to the angle between the projections. This pair of lines is then determined, which yields the normal of the detector plane. This normal is then used for solving five correction parameters for each view angle.

The correction parameters are used to offset displacements of the detector head during rotation around a subject, as well to correct misalignments in the two-dimensional image plane of the detector head with respect to the fixed coordinate system of the CT imaging modality of the hybrid system.

Thus, according to the hybrid SPECT/CT calibration method, an absolute coordinate system is established in the center of the CT Field of View (FOV). When the phantom is moved to the SPECT FOV, a coordinate transformation matrix can be obtained by recording the displacement of the patient bed (on which the phantom is placed). The transformation matrix is then applied to derive the absolute coordinates of the phantom in the SPECT FOV. Once the absolute coordinates of the phantom are known, point source projections of the phantom can be calculated regardless of the geometrical complexity of the phantom.

Accordingly, there remains a need in the art for improvement in correction of projection image positional errors in order to improve the accuracy and quality of such images when used in SPECT image reconstruction. In particular, it would be desirable to be able to establish an absolute coordinate system for a calibration phantom in a SPECT FOV for a SPECT imaging system, without performing an actual CT scan.

SUMMARY OF THE INVENTION

The present invention provides a novel method for more accurate SPECT detector head position calibration.

The present invention provides a method wherein an isotope point source P of the calibration phantom is designated as the origin of an absolute coordinate system and the center of an image reconstruction space.

The point source P is then adjusted so as to lie within a crosshair projected on detector panels at image center locations. The crosshair position is denoted as the center of the image reconstruction coordinate system. The detector panels are initially placed around the phantom at 0 and 180 degree locations for calibration of the absolute coordinate system origin in the X-Z plane, and the energy profile of the point source P is acquired. 2D Gaussian surfaces are fitted to the peak of the point source P profile for each detector, from which x and y displacement parameters are determined for bed displacement calculation. The position of the point source P at the calculated bed displacement positions is then denoted as the origin of the absolute coordinate system in the X-Z plane. The process is repeated after rotating the detector panels to the 90 and 270 degree positions, to calculate the displacement along the Y axis or Y-Z plane. The displacement parameters so determined are then used to adjust the bed height. In this manner, the origin of the absolute coordinate system can be precisely aligned in three-dimensional space to the center of the image reconstruction space.

BRIEF DESCRIPTION OF THE DRAWINGS

The present invention will become more fully understood from the detailed description given herein below and the accompanying drawings which are given by way of illustration only, and are not limitative of the present invention, and wherein.

DETAILED DESCRIPTION OF THE EXEMPLARY EMBODIMENTS

Figure 1:
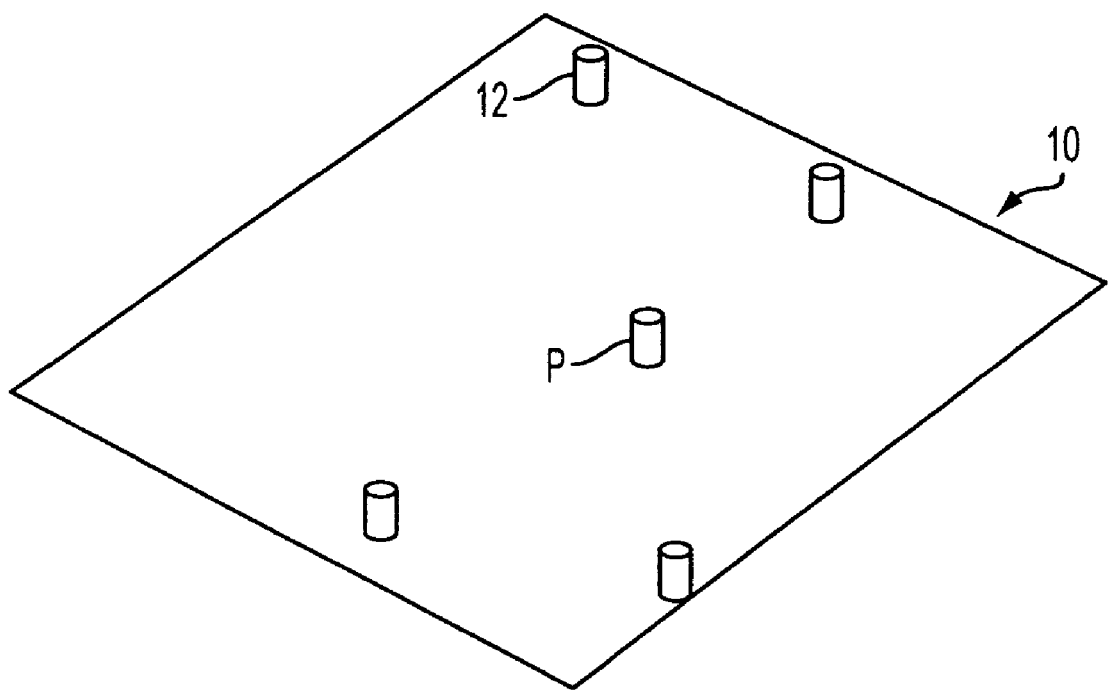
FIG. 1 is a perspective view of a test phantom according to an exemplary embodiment of the present invention.

Referring to FIG. 1, a test phantom 10 is provided with a number of radioisotope point sources 12, with the center point source being denoted as point source P. In an exemplary embodiment, the test phantom comprises five point sources. Each point source comprises a capsule containing an appropriate amount of radioactive material, such as $^{99}$Tc or $^{57}$Co. The point source capsules 12 typically are mounted on a plate in a manner such that attenuation artifacts caused by interaction between the plate material and the point sources are minimized. As shown, the test phantom structure is such that a plurality of point source isotopes are located such that lines connecting any two pairs of said point source isotopes will be skewed with respect to each other.

Figure 2:
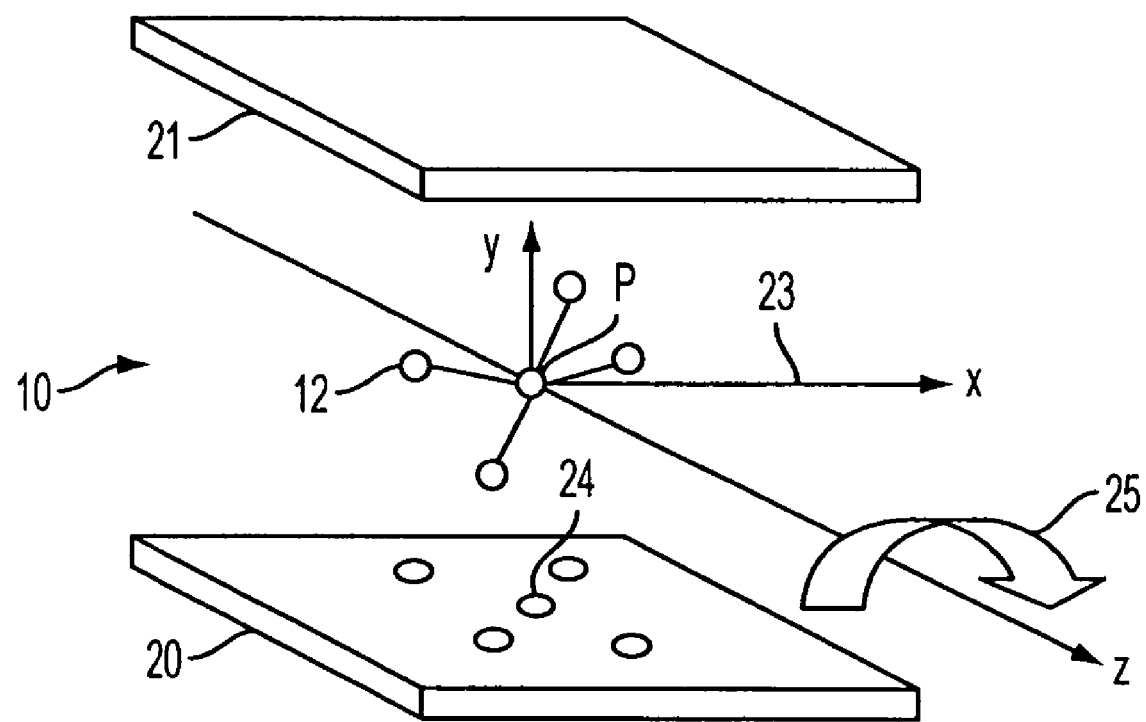
FIG. 2 illustrates an absolute coordinate system calibration configuration for detectors at 0 and 180 degree positions.

The phantom with loaded point sources is then subjected to SPECT imaging over four projection view angles (ie., 0, 90, 180 and 270 degrees). First, as shown in FIG. 2, panel detectors 20 and 21 are placed in 0 and 180 degree rotation positions, respectively, about the test phantom 10 (Step 701, FIG. 7). Coordinate system 23 is fixed to the image reconstruction space.

A cross-hair mark 24 is projected on the surfaces of the panels 20 and 21 at the location of an image center denoted by the position vector $$\vec{v}_c = (n-1, n-1)/2 \qquad (1)$$

where n is the image size.

The patient bed on which the test phantom is mounted is then adjusted along the Z-axis until the projection of point source P on the detector panel surface is substantially within the cross-hair mark 24.

Figures 3A, 3B:
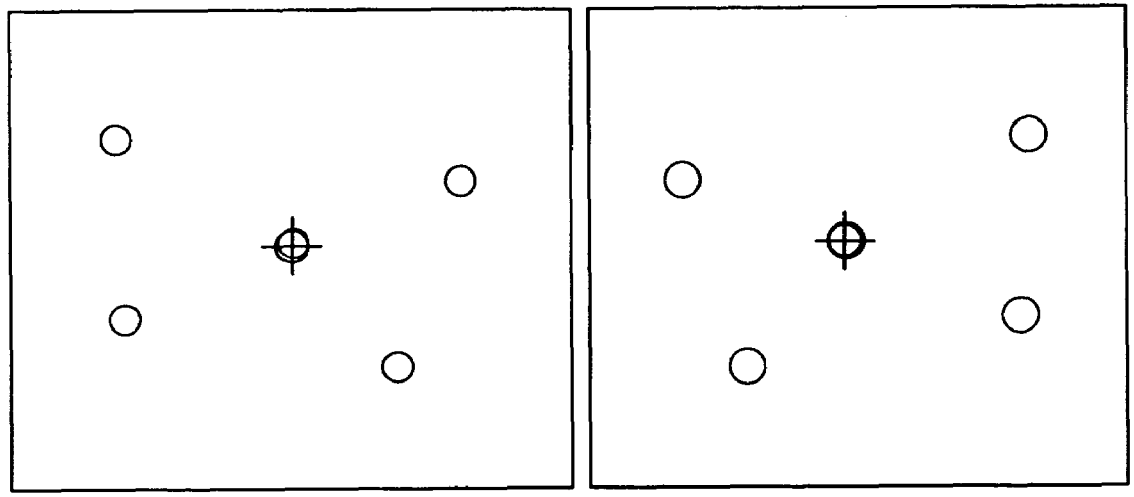
FIGS. 3a and 3b are images from respective detectors of FIG. 2.

Radiation distribution data then is acquired by the detectors 20 and 21, resulting in images as shown in FIGS. 3(a) and 3(b), respectively. A 2D Gaussian surface, which can be written as $$G(x, y) = c_0 + \lambda e^{\frac{1}{2}U} \qquad (2)$$

is then fitted to the peak of point source P for each image. The elliptical function U in Equation (2) above is represented as $$U = \left(\frac{x}{\sigma_x}\right)^2 + \left(\frac{y}{\sigma_y}\right)^2 \qquad (3)$$

where the lengths of the axes of ellipse U are $2\sigma_x$ and $2\sigma_y$, and the center of ellipse U is located at $(x_0, y_0)$. Ellipse U is then rotated $\tau$ degrees from the X axis in the clockwise direction as shown by arrow 25 in FIG. 2, such that the rotated coordinate system is defined as $$\begin{bmatrix} x \\ y \end{bmatrix} = \begin{bmatrix} \cos\tau & -\sin\tau \\ \sin\tau & \cos\tau \end{bmatrix} \begin{bmatrix} x' - x_0 \\ y' - y_0 \end{bmatrix} \qquad (4)$$

Figure 4:
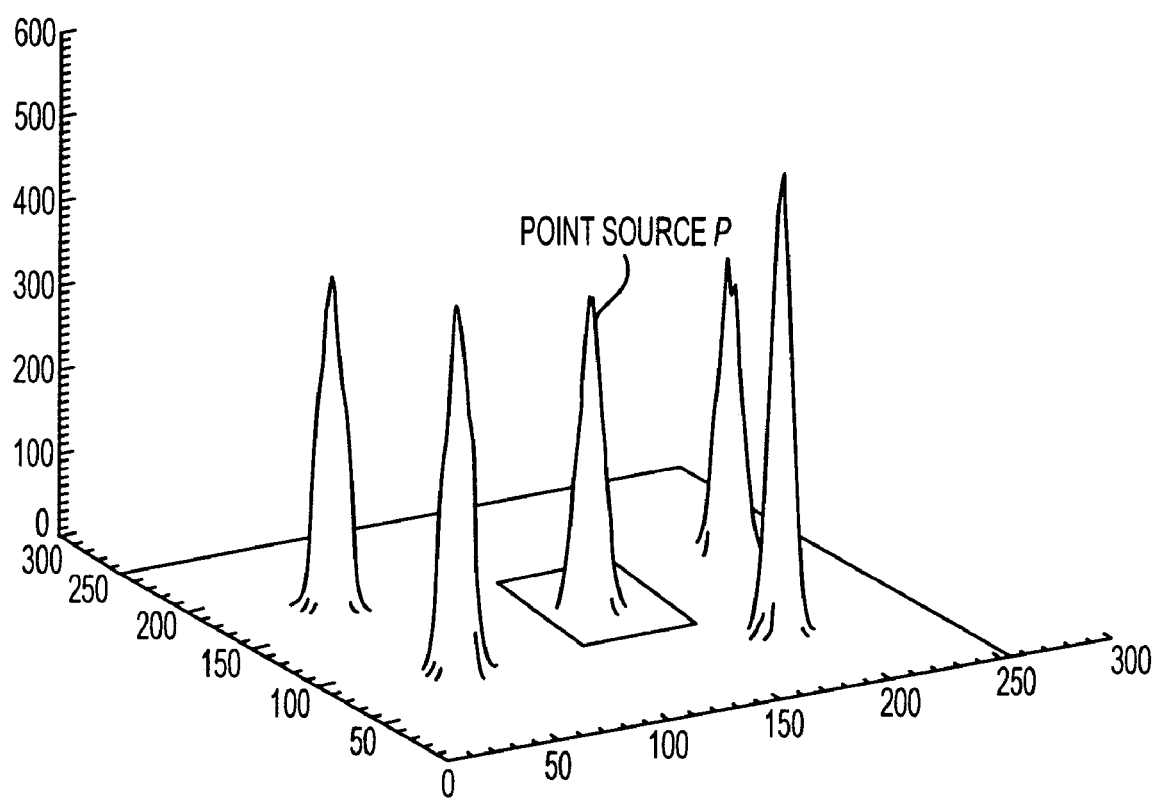
FIG. 4 is a three-dimensional depiction of a 2D Gaussian surface fitting for the center point source P of the absolute coordinate system.

FIG. 4 shows an acquired single pinhole image and its 2D Gaussian fit. In this Gaussian model, there are seven parameters: $c_0, \lambda, \sigma_x, \sigma_y, x_0, y_0$, and $\tau$, of which $x_0$ and $y_0$ are used directly for patient bed position displacement calculation.

The position vector of point source P in the image when the detector is rotated i degrees is denoted as $$\vec{v}_0^{\,i} = (x_0^i, y_0^i), (i=0, 180 \text{ deg.}) \qquad (5)$$

Then, the origin of the absolute coordinate system can be determined as the position vector $$\vec{v} = \frac{\vec{v}_0^{\,0} + \vec{v}_0^{\,180}}{2} \qquad (6)$$

The patient table then is adjusted by the amount $\vec{v} - \vec{v}_c$ along each of the X and Y axes (Steps 702 and 703, FIG. 7), such that the projection of the point source P on the X-Z plane of the absolute coordinate system is now aligned with the image reconstruction space coordinate system.

Figure 5:
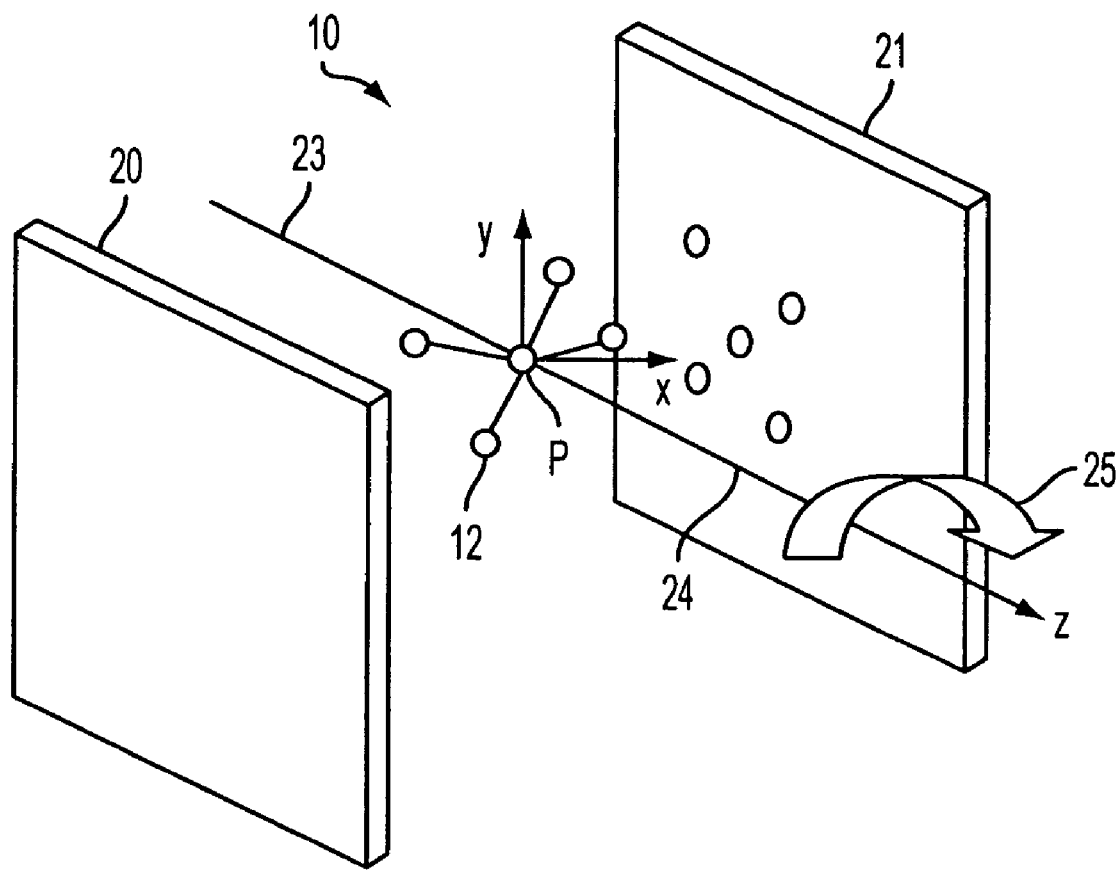
FIG. 5 illustrates an absolute coordinate system calibration configuration for detectors at 90 and 270 degree positions.
Figure 6A:
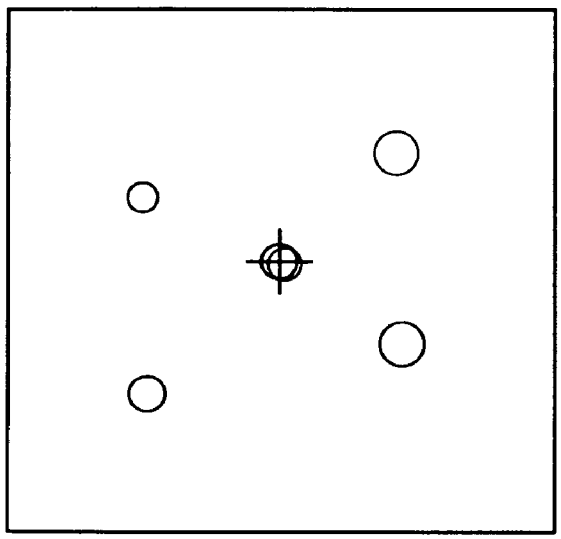
FIGS. 6a and 6b are images from respective detectors of FIG. 5.
Figure 6B:
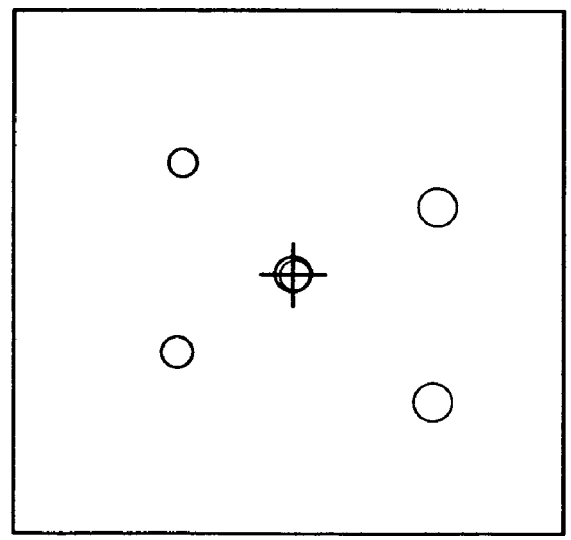

As shown in FIG. 5, the detectors are then placed in 90 and 270 degree rotation positions about the test phantom (Step 704, FIG. 7), the point source P is moved to the cross-hair, and radiation projection data is acquired by each detector as shown in FIGS. 6(a) and 6(b). The 2D Gaussian fit process is then repeated to obtain the origin vector position in the Y-Z plane. The height of the patient table then is adjusted by the vector difference amount obtained in the 90-270 detector placement (Step 705, FIG. 7), such that the origin of the absolute coordinate system can be aligned with the center of the image reconstruction space coordinate system in the Y-Z plane.

Figure 7:
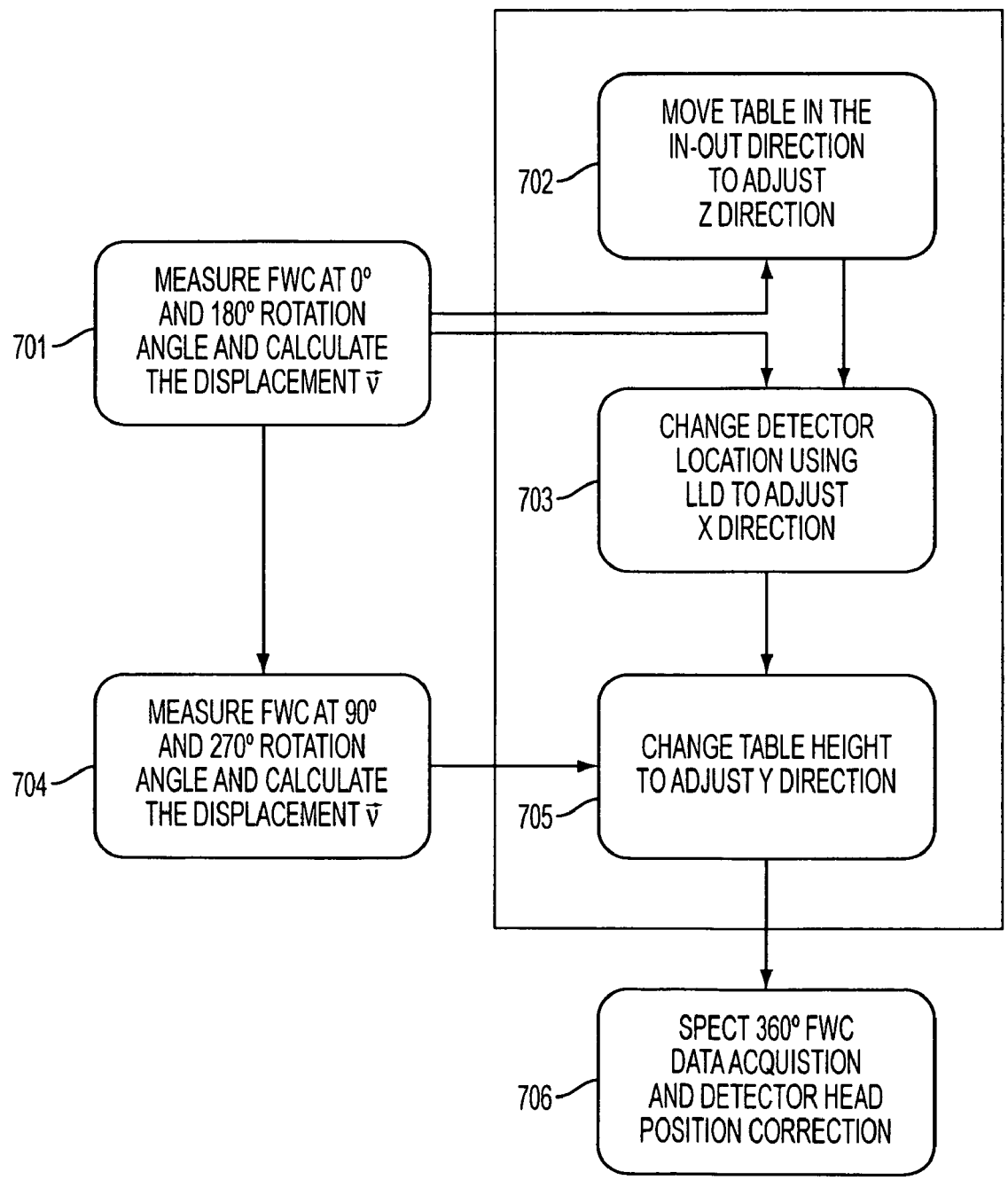
FIG. 7 is a data flow diagram illustrating the entire calibration process to establish an absolute coordinate system according to an exemplary embodiment of the present invention.

With the patient bed so adjusted, there is achieved a full calibration of the image reconstruction space coordinate system with the absolute coordinate system, such that accurate correlation of clinical SPECT image data acquired from the two detectors can be performed (Step 706, FIG. 7).

The invention having been thus described, it will be obvious to those skilled in the art that the same may be varied in many ways without departing from the spirit and scope of the invention.

For example, while a test phantom using five point sources has been described, the number of point sources may be varied to more or less than five, and their spatial relationships also may be varied, in order to obtain an optimal configuration for detector head calibration purposes as taught by the present invention. Any and all such modifications are intended to be included within the scope of the following claims.

What is claimed is:

1. A method for calibrating a nuclear medical imaging apparatus having multiple detectors, comprising the steps of:
    determining at least one image center location on at least one of said multiple detectors;
    aligning a multiple isotope point source test phantom so that a center point source of said phantom lies within said center location;
    acquiring image data of said multiple point source test phantom with said detectors;
    fitting a Gaussian surface to a peak of acquired data of said center point source;
    using said fitted Gaussian surface to calculate a position of said center point source as an origin of a first coordinate system; and
    adjusting a position of said test phantom such that said calculated center point source position is aligned with said center location.

2. The method of claim 1, wherein said test phantom is mounted to a patient bed of said nuclear medical imaging apparatus, and said step of aligning comprises the step of moving said patient bed along a predetermined axis of an image reconstruction space coordinate system.

3. The method of claim 2, wherein said center location is represented as a position vector, and step of aligning comprises moving said patient bed until a projection of said center point source corresponds to said position vector.

4. The method of claim 1, wherein said Gaussian surface is a two-dimensional Gaussian surface.

5. The method of claim 4, wherein the step of using said fitted Gaussian surface comprises the step of rotating said fitted surface from a predetermined axis of said image reconstruction space coordinate system by a determined angle to obtain position displacement parameters.

6. The method of claim 5, wherein the step of adjusting comprises moving said patient bed by a distance related to said position displacement parameters.

7. The method of claim 5, wherein the step of using further comprises the step of solving vector equations describing locations of two-dimensional point source centroids in a three-dimensional image space.

8. The method of claim 1, wherein said test phantom comprises a structure having a plurality of point source isotopes at locations such that lines connecting any two pairs of said point source isotopes will be skewed with respect to each other.

9. The method of claim 8, wherein said test phantom comprises five radioisotope point sources.

10. A method for calibrating a nuclear medical imaging apparatus having multiple detectors, comprising the steps of:
    determining at least one image center location on at least one of said multiple detectors;
    aligning a multiple isotope point source test phantom so that a center point source of said phantom lies within said center location;
    placing said detectors at first locations with respect to said test phantom;
    acquiring image data of said multiple point source test phantom with said detectors;
    fitting a Gaussian surface to a peak of acquired data of said center point source;
    using said fitted Gaussian surface to calculate a position of said center point source as an origin of a first coordinate system;
    adjusting a position of said test phantom such that said calculated center point source position is aligned with said center location;
    placing said detectors at second locations with respect to said test phantom;
    acquiring image data of said multiple point source test phantom with said detectors at said second locations;
    fitting a Gaussian surface to a peak of acquired data of said center point source at said second locations;
    using said fitted Gaussian surface at said second locations to calculate a position of said center point source as an origin of said first coordinate system; and
    adjusting a further position of said test phantom such that said calculated center point source position is aligned with said center location position.

11. The method of claim 10, wherein said first detector locations are 0 and 180 degree rotational locations with respect to said first coordinate system.

12. The method of claim 10, wherein said second detector locations are 90 and 270 degree rotational locations with respect to said first coordinate system.

13. The method of claim 10, wherein said test phantom is mounted to a patient bed of said nuclear medical imaging apparatus, and said step of aligning comprises the step of moving said patient bed along a predetermined axis of an image reconstruction space coordinate system.

14. The method of claim 13, wherein said center location is represented as a position vector, and step of aligning comprises moving said patient bed until a projection of said center point source corresponds to said position vector.

15. The method of claim 10, wherein said Gaussian surface is a two-dimensional Gaussian surface.

16. The method of claim 15, wherein the step of using said fitted Gaussian surface comprises the step of rotating said fitted surface from a predetermined axis of said image reconstruction space coordinate system by a determined angle to obtain position displacement parameters.

17. The method of claim 16, wherein the step of adjusting comprises moving said patient bed by a distance related to said position displacement parameters.

18. The method of claim 16, wherein the step of using further comprises the step of solving vector equations describing locations of two-dimensional point source centroids in a three-dimensional image space.

* * * * *